July 1, 1969 W. L. OATES 3,453,545
PROBE ASSEMBLY FOR TESTING SEMICONDUCTOR WAFERS INCLUDING A
WAFER VIBRATOR FOR EFFECTING GOOD TEST CONNECTIONS
Filed July 7, 1967

INVENTOR
WILLIAM L. OATES
BY M. Y. Epstein
ATTORNEY

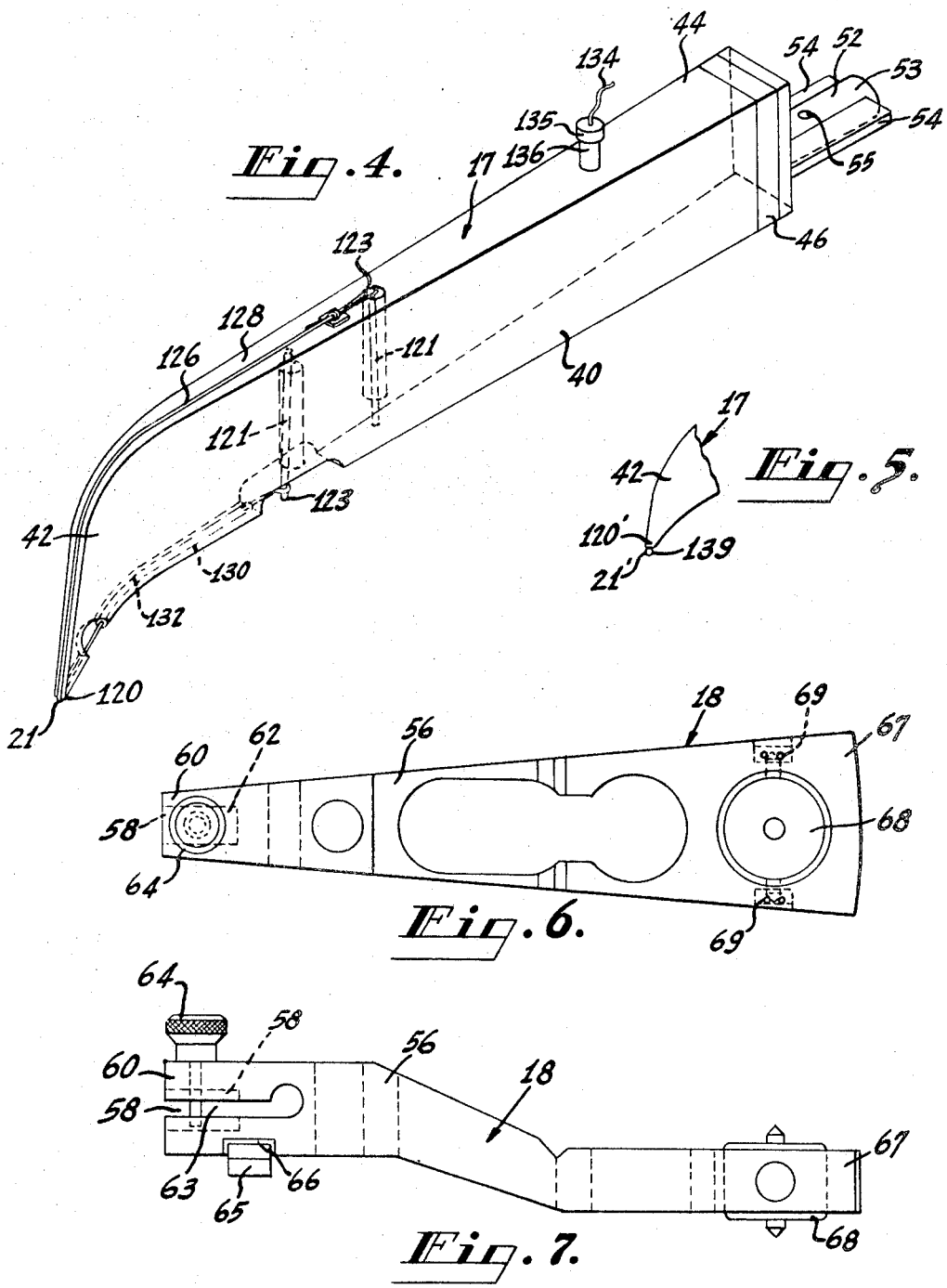

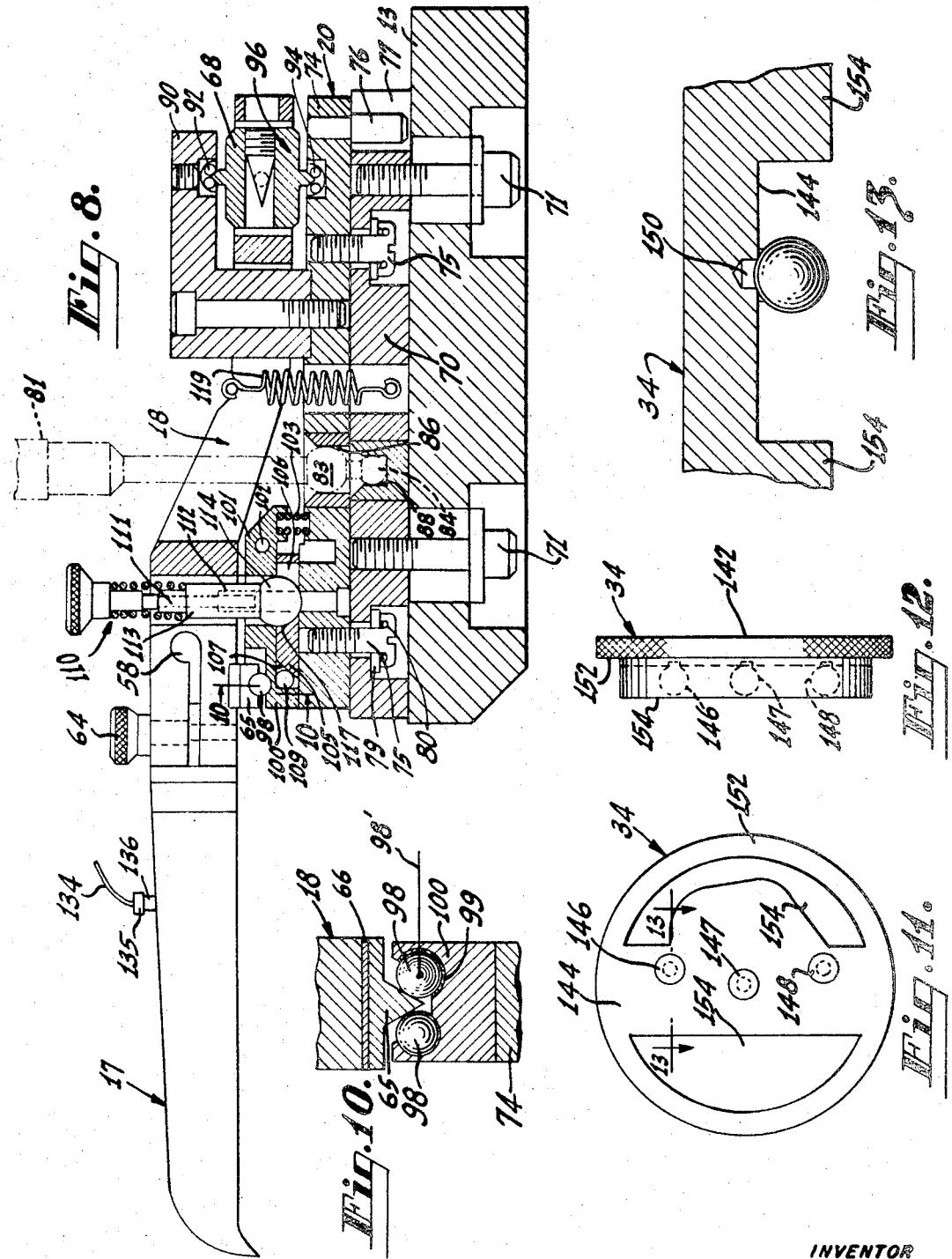

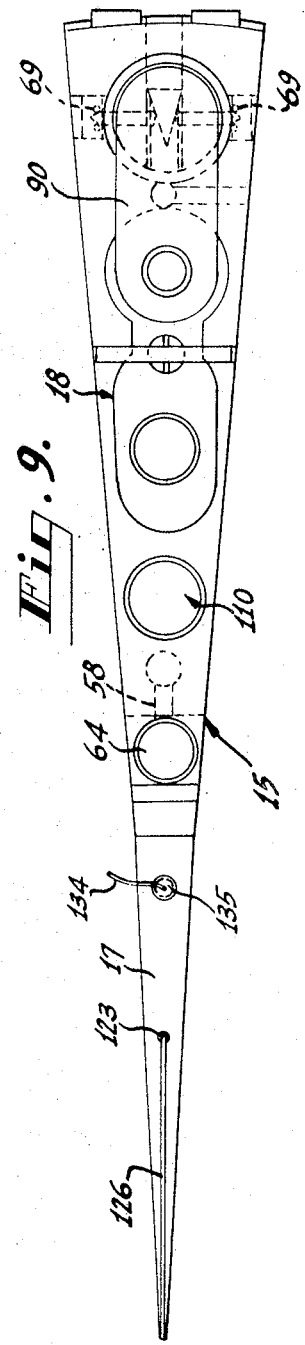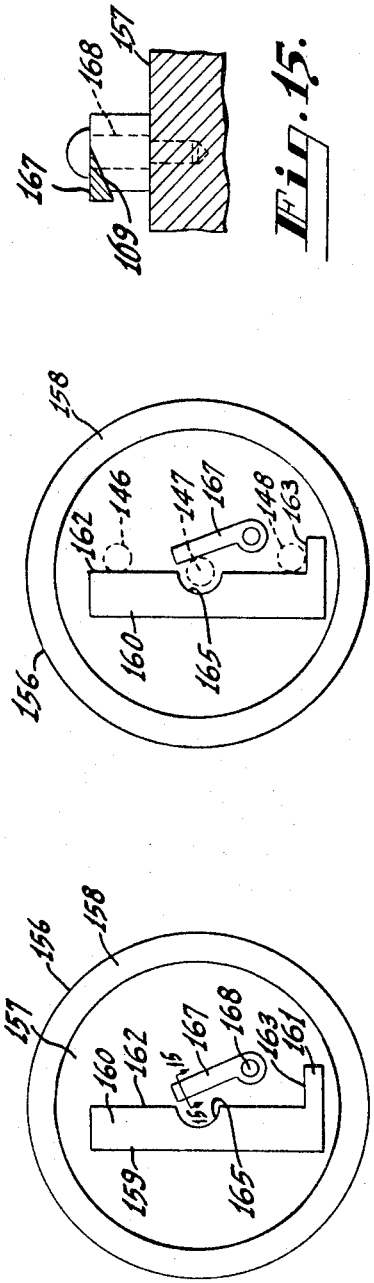

United States Patent Office 3,453,545
Patented July 1, 1969

3,453,545
PROBE ASSEMBLY FOR TESTING SEMICONDUC-
TOR WAFERS INCLUDING A WAFER VIBRATOR
FOR EFFECTING GOOD TEST CONNECTIONS
William L. Oates, Bernardsville, N.J., assignor to Radio
Corporation of America, a corporation of Delaware
Filed July 7, 1967, Ser. No. 651,885
Int. Cl. G01r 31/28, 31/02
U.S. Cl. 324—158                                    9 Claims

ABSTRACT OF THE DISCLOSURE

An apparatus for sequentially testing each device on a semiconductor wafer is provided. The apparatus comprises a support column having a fixture on the end thereof for receipt of a platform on which a wafer to be tested is mounted. The platform is removable, whereby a wafer can be mounted on the platform at a station removed from the apparatus. Disposed in surrounding relation to the support column is a probing assembly comprising a plurality of inwardly extending probes. The inner ends of the probes are disposed in an array corresponding to the electrode contacts on each wafer device. The probes have a bird-beak like shape and are thin in comparison to their width, whereby a large number of probes can be disposed in circular array around the support column. Means are provided for indexing the support column in orthogonal directions for sequentially registering each wafer device with the array of probe tips; for lifting the wafer into contact with the probe tips, the tips being raised thereby; and for vibrating the wafer in a direction perpendicular to its surface. The probes are mounted on supports by means of gimbal joints, whereby the probe tips move freely with the wafer upon being lifted thereby. Means are provided for electrically testing each of the wafer devices through the probes, and means are provided for marking the defective devices for eventual discard.

Background of the invention

This invention relates to apparatus for testing semiconductor devices, and particularly to a test apparatus of the type known as a "probing machine."

In the manufacture of semiconductor devices, e.g. integrated circuit devices, it is the practice to provide, by photolithographic and diffusion techniques, rows and columns of spaced and discrete semiconductor device chips or pellets, or simply "devices," on a single semiconductor wafer. The wafer is thereafter diced to provide the individual semiconductor device pellets which are then assembled within semiconductor device envelopes.

Prior to the dicing operation, it is the practice to test each of the semiconductor "devices" for operability, and to mark the defective devices for discard.

Each device includes a plurality of metal surface contacts by means of which the device can be electrically connected to terminals of the device envelope. In the testing of the devices on the wafer, the devices are successively tested by contacting each of the metal contacts of each device with a different test probe of a probing assembly.

The devices are small and fragile. A representative 24 contact device, for example, measures 73 by 73 mils, and has six contacts disposed along each side thereof on 10 mil centers. The contacts comprise thin metal depositions having a thickness in the order of 7,000 angstroms, and measure 4 by 4 mils. Prior art apparatuses are incapable of testing such 24 contact devices because, owing to the arrangement of the contacts and the close spacing therebetween, insufficient space is available to permit engagement of each contact with a prior art probe without mechanical and electrical interference of the probes with one another. A further problem with prior art apparatus is that it has been found extremely difficult to obtain reproducibility and accuracy of the test readings. This occurs because of the prior art difficulty of engaging the probes with the device contacts with uniform and reproducible pressure; because of the difficulty of maintaining the probes with a uniform sharpness; and because of the difficulty of providing exact repositioning of each probe after engagement with a device to ensure proper engagement of the probes with the contacts of successive devices. Another problem has been the difficulty of obtaining a positive electrical engagement of the sharp probe tips with the contacts while avoiding wide variations in electrical resistance and damage to the thin metal contacts. A still further problem is that of the excessive period of time involved in mounting the wafer to be tested on the probe apparatus in precise registry with the probes. The prior art wafer mounting process causes a significant reduction in machine efficiency.

Summary of the invention

Apparatus is provided comprising a platform on which the wafer to be tested is mounted, a plurality of probes for engaging each contact of the wafer devices, means for mounting the probes, and means for indexing the platform and the probe mounting means relative to one another for succesively engaging the contacts of each wafer device with the probes. The wafer platform includes simple and precise means for mounting the platform in identical, preselected orientation at two or more operating stations, whereby a wafer can be mounted on the platform in precise orientation with respect to the probes on the probing apparatus while the platform is removed from the apparatus. This reduces the down-time of the probing apparatus.

Each probe comprises a curved pointed member having a decreasing width and thickness towards the pointed end of the probe. In one embodiment, a fine wire is strung along the edge of the probe and around the probe point. In operation, the portion of the wire curved around the probe point serves as the contact engaging "tip" of the probe. The sharpness of the probe "tip" is determined by the diameter of the wire and the profile radius or sharpness of the probe points. Since both these factors are controllable to a high degree of accuracy, probes having uniform tip sharpness are readily obtained. Upon wear of the wire, the probe is readily re-strung with another wire.

In another embodiment, a small metal ball is mounted on the point of the probe. The ball serves as the probe "tip." The size of the ball, which is accurately controllable, determines the sharpness of the probe tip. The ball is readily replaceable upon wear.

The probe mounting means includes means for precisely registering each probe tip with its respective device contacts upon successive indices of the apparatus, and includes means for allowing substantially uninhibited movement of the probes with the wafer upon engagement of the probe tips with the contacts. This avoids scraping and damaging of the contacts by the probe tips. Means are provided to determine if all the probe tips have engaged their respective contacts, and means are provided for vibrating the wafer supporting platform in a direction perpendicular to the plane of the wafer for causing penetration of the probe tips through any electrically insulating films covering the device contacts.

Brief description of the drawing

FIG. 4 is a view in perspective of a probe of the apparatus of FIG. 3;

FIG. 5 is a side elevation showing a modification of the probe shown in FIG. 4;

FIG. 6 is a plan view of a probe support arm of the apparatus of FIG. 3;

FIG. 7 is a side elevation of the probe support arm;

FIG. 8 is a side elevation, partly in section of a probing mechanism;

FIG. 9 is a plan view of the probing mechanism;

FIG. 10 is a section along line 10—10 of FIG. 9;

FIG. 11 is a bottom view of the wafer supporting platform;

FIG. 12 is a side view of the wafer supporting platform;

FIG. 13 is a section along line 13—13 of FIG. 11;

FIG. 14 is a plan view of the platform supporting fixture;

FIG. 15 is a section along line 15—15 of FIG. 14; and

FIG. 16 is a view similar to FIG. 14 but illustrating the mounting of the wafer supporting platform on the fixture.

*Description of a preferred embodiment general description*

Figure 1:
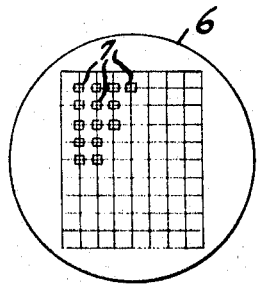
FIG. 1 is a plan view of a semiconductor wafer.
Figure 2:
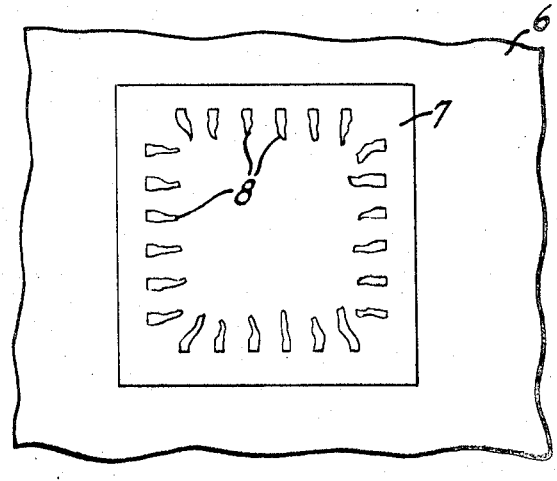
FIG. 2 is an enlarged view of the wafer, showing a single device thereon.

A wafer workpiece 6 of the type which can be tested on the probing apparatus of the present invention is shown in FIG. 1. The wafer 6 is a thin disc of a semiconductor material, e.g. silicon, having orthogonal rows and columns of spaced semiconductor devices 7 thereon. As shown in FIG. 2, each device 7 has a plurality of metal contacts 8 which are electrically connected to various components, not shown, on the device. In the testing of each device 7 on the wafer 6, electrical contact is made by means of a plurality of test probes with the plurality of contacts of the device being tested, and electrical signals are applied to the device through the probes. In some instances, the contacts 8 comprise a deposit of aluminum, which acquires a surface film or coating of aluminum oxide. For low electrical resistance contacting of the test probes with the device contacts, it is desirable that the probes penetrate the aluminum oxide film.

Figure 3:
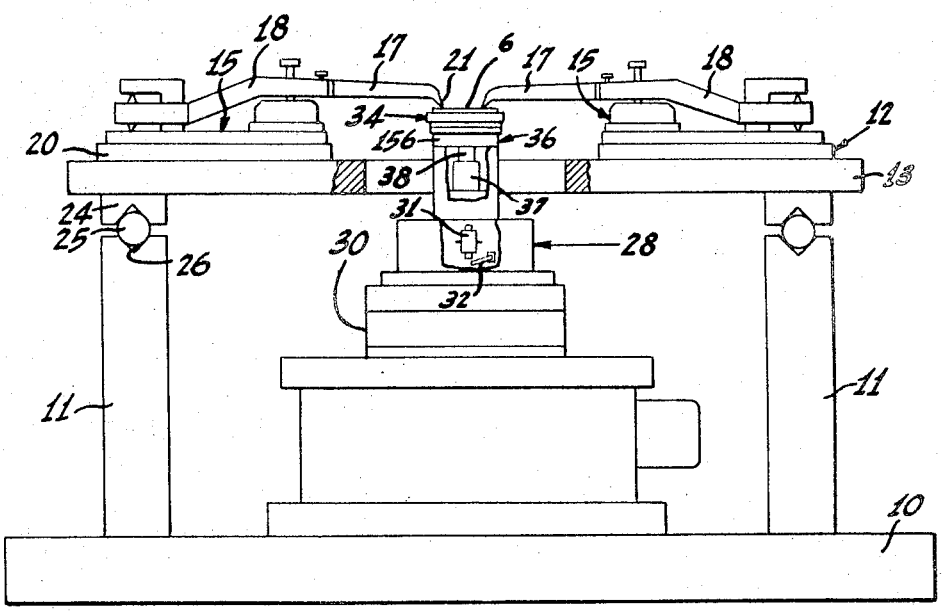
FIG. 3 is a side elevation, partly broken away, of apparatus according to the present invention.

With reference to FIG. 3, a general description of an apparatus embodying the present invention is given. The apparatus comprises a base plate 10 on which are mounted four (only two of which are shown) equally spaced support columns 11. Mounted on the columns 11 is a probing assembly 12 comprising an annular plate 13 having a plurality of probing mechanisms 15 mounted thereon. Two probing mechanisms 15 are shown. In this embodiment, 24 radially extending probing mechanisms 15, spaced around the central opening in the annular plate 13, are used.

Each probing mechanism 15 comprises an inwardly extending probe 17 mounted on a support arm 18 which is mounted, in turn, on a support platform 20. The inner ends or tips 21 of the probes 17 are disposed in an array corresponding to the array of contacts on each wafer device.

The probing assembly 12 is accurately and removably mounted on the colums 11 by means of V blocks 24 secured to the underside of the plate 13. The V blocks 24 rest on and are accurately positioned by dowels 25 which rest in and are accurately positioned by V grooves 26 on the top of the columns 11. The probing assembly 12 is held in place solely by its own weight and can be lifted off the columns for adjustment or replacement.

Extending upwardly through the opening in the annular plate 13 is a workpiece supporting column 28 mounted on an indexing mechanism 30. The mechanism 30 serves the function of sequentially indexing the column 28 in orthogonal directions, Included within the column 28 is a means for causing vertical vibration of the column. Such means can comprise, for example, a vertically mounted iron-cored solenoid 31 having a magnetic, spring biased hammer 32 associated therewith. Energization of the solenoid by means of an electrical pulse generating system of known type causes the hammer to strike the core at a controlled rate, duration, and force. The impulses are transmitted through the solenoid core to the column 28.

Mounted on top of the column 28 is a fixture 36 on which is removably mounted a platform 34. A wafer 6 to be tested is mounted on the platform 34, the wafer being disposed, in a manner described hereinafter, in accurate angular and lateral alignment with the probing assembly 12 and the directions of index of the indexing mechanism 30.

Also included within the supporting column 28 is a means for lifting or raising the fixture 36 on which the wafer carrying platform 34 is mounted. Such means can comprise, for example, a vertically disposed air cylinder 37 having a piston 38 upon which the fixture 36 is mounted. Elongated vertically disposed bearings (not shown) are preferably used to provide exact vertical up and down movement of the fixture 36 upon actuation of the air cylinder 37.

In operation of the apparatus, the lifting means raises the wafer into contact with the tips 21 of the probes 17. Each probe tip 21 engages a different contact of one of the devices 7 on the wafer, and the column 28, with the wafer thereon, is vertically vibrated to cause the probe tips to penetrate any electrically insulating films covering the contacts for the purpose of making low electrical resistance engagement with the contacts. Electrical signals are applied to the device through the probes 17 by means, not shown, and the device is electrically tested. If electrically unsatisfactory, the device is marked, e.g., by an ink drop provided by a known type hypodermic needle type marker (not shown) mounted on the probing assembly. Thereafter, the wafer is lowered and the indexing mechanism 30 indexes the wafer support column to align a new device with the probe assembly. The wafer is again lifted and the newly aligned device is tested.

Various portions of the above-described apparatus, such as the electrical testing means and the indexing mechanism are generally known.

For example, the testing means can comprise the Automatic Integrated Circuit Test Set, Model No. 4,000, sold by Fairchild Camera Corporation, Mountain View, Calif.

The indexing mechanism can comprise, for example, the XY500 Index Table, sold by the Transistor Automatic Corporation, Cambridge, Mass.

*Probing assembly*

A probe 17 is shown in detail in FIG. 4. The probe 17 comprises an elongated member 40 having, in plan, a wedge shape, and a curved pointed tip end 42. Details of the tip end 42 are provided hereinafter. The rear end 44 of the probe 17 includes a block 46 of insulating material and a rearwardly extending connector member 52 comprising a cylindrical pin 53 having laterally extending flanges 54. A bore 55 is provided extending through the pin 53.

The support arm 18, shown by itself in FIGS. 6 and 7, comprises an elongated tapered member 56 having an opening or receptacle 58 at its narrow end 60 for receipt of the connector member 52 of the probe 17. (For convenience of illustration, the probe 17 shown in FIG. 4 is not drawn to the same scale as the support arm 18 shown in FIGS. 6 and 7.) The receptacle 58 has an axially extending cylindrical portion 62 for receipt of the cylindrical pin 53 of the connector 52, and a laterally extending slot 63 for receipt of the flanges 54 of the connector. A clamp screw 64 is provided for clamping the probe connector 52 firmly in place within the receptacle 58.

The probe-support arm mounting arrangement described provides an accurate and precise mounting of each probe 17 on its support mechanism while allowing easy removal and replacement of the probes.

Near the front or narrow end 60 of the support arm 18 is a downwardly extending wedge 65 (FIG. 7) mounted by means of an insulating member 66 on the support arm 18. Near the rear or wide end 67 of the arm 18 is a member 68 of a gimbal joint. The member 68 is pivotally mounted between sets of bearings 69 (FIG. 6) in the arm 18. The purpose of these various apparatus parts appears hereinafter.

The probe 17 and support arm 18 are shown, in FIGS. 8 and 9, in assembled relation and mounted on the support platform 20. As shown in FIG. 9, the entire probing mechanism 15, in plan, comprises a sector of a circle having a small included angle. In one embodiment, for example, the included angle of the probing mechanisms is less than 7°. Mechanical strength for the probes 17 is provided by the relatively large width or height of the probes. Because of the small included angle of the probing mechanisms 15, a relatively large number of probing mechanisms, e.g., in excess of 30, can be provided spaced around the annular plate 13.

The prior art probes comprise cylindrical needles which taper to a point at an angle in the order of 12°. Owing to the fact that the needles are used in an inclined position, usually at an angle of 45°, the projection of the probes on the plane of the wafer workpiece has an included angle in the order of 17°. This limits the number of probes that can be disposed in a circular array to about 20. Needle points of smaller taper, that is, of smaller included angle, are generally impractical due to the requirements of mechanical strength.

With reference to FIG. 8, the support platform 20 comprises a base plate 70 which is rigidly mounted on the probe assembly pate 13 by means of screws 71. To provide a degree of lateral adjustability of each support platform 20, for obtaining precise positioning of each probe with respect to the workpiece support column 28 (FIG. 3) during set-up of the apparatus, a second base plate 74 is provided mounted on the first base plate 70. The plate 74 is mounted by means of screws 75 and a pin 76 secured to the plate 74 at the rear thereof and extending, in sliding fit, into a slot 77 in the plate 70. The slot 77 extends in a radial direction with respect to the probing assembly annular plate 13. Disposed between the head of each screw 75 and a washer 79 is a silicon O-ring 80. The presence of the O-rings allows friction sliding of the plates 70 and 74 relative to one another after the screws 75 have been tightened. To effect such movement, a removable tool 81, shown in phanton in FIG. 8, having a pair of pivoting balls 83 and 84 thereon, is inserted through a bore 86 through the plate 74 and into a blind bushing 88 in the plate 70. Pivoting of the plate 74 about the axis of the pin 76, and movement of the plate 74 radially inwardly and outwardly along the slot 77, is obtained by tilting of the tool 81.

Mounted on the support plate 74 is an L-shaped member 90 having a set of bearings 92 therein disposed opposite to a set of bearings 94 in the support plate 74. The gimbal member 68 is pivotally mounted between the bearing sets 92 and 94. The bearing sets 92 and 94, the bearing sets 69 (FIG. 6) in the support arm 18, and the member 68 constitute a gimbal joint 96 by means of which the support arm 18 is mounted on the support platform 20. An advantage of this mounting arrangement is described hereinafter.

For accurately controlling the "at rest" positioning of each probe 17, that is, the location of the probes when they are not engaged with the wafer 6, a pair of oppositely disposed metal contact balls 98 (see also FIG. 10) forming a groove for receiving the wedge 65 on the support arm 18 are provided. The balls 98 are accurately positioned in a holder 100 mounted on the base plate 74. Preferably, for a reason described hereinafter, at least one of the balls 98 is electrically insulated from the holder 100, as by means of an epoxy cement 99 (FIG. 10), and has an electrical connector wire 98' extending therefrom.

To provide vertical adjustability of the "at rest" position of each probe 17 during the set-up of the probe assembly 12, means are provided for upwardly or downwardly tilting the holder 100 containing the contact balls 98.

As shown in FIG. 8, the holder 100 is an elongated member pivoted at its rear end 101 about a pin 102 mounted on a bracket (not visible) secured to the base plate 74. A compression spring 103 is provided between the end 101 if the holder 100 and the base plate 74 biasing the holder in a counterclockwise direction. Disposed between the holder 100 and the base plate 74 is a slidable block 105 having an opening 106 therethrough. The front surface 107 of the block 105 is tapered and serves as a wedge which acts upon a steel ball 109 secured to the holder 100. Movement of the block 105 to the left or right (as viewed in FIG. 8) causes clockwise or counterclockwise tilting, respectively, of the holder 100 about the pin 102. To effect such block movement during set-up of the probe assembly, a hollow adjustment tool 110 is provided. The tool 110 comprises an elongated pin 111 which is in threaded engagement with a hollow upwardly extending stud 112 mounted on the base plate 74. A hollow sleeve 113 having a hollow ball 114 on the end thereof is mounted on the pin 111. The stud 112 extends upwardly through the ball 114 and inwardly of the sleeve 113. Downward screwing of the tool 110 into the stud 112 causes the ball 114 to act against a tapered surface 117 of the block 105, thereby causing movement of the block to the left and upward tilting of the holder 100. Upward screwing of the tool 110 allows movement of the block 105 to the right and downward tilting of the holder under the influence of the spring 103.

When set up, as described, each probe 17 has an accurately defined "at rest" position to which the probes return when the probes are disengaged from the wafer. This insures a preselected positioning of all the probe tips relative to one another and relative to the workpiece support column 28 for providing proper contact of each probe tip 21 with its respective device contacts upon successive indices of the apparatus.

To provide a uniform pressure of the probe tips 21 against the wafer device contacts a tension spring 119 is provided secured between the support arm 18 and the plate 70.

To ensure positive engagement of the wafer 6 with each of the probes 17, the wafer is raised slightly higher, e.g., 0.002 inch, than the "at rest" vertical positioning of the probe tips 21. The wedges 65 on the support arms 18 are thus lifted from contact with the contact balls 98 on the support platform 20 when the wafer is in its fully raised position. Owing to the gimbal mounting of the support arm 18 on the platform 20, and the small upward movement of the probes in comparison with the probe lengths, the probe tips are substantially completely free to follow the movement of the wafer. An advantage of this is that once contact between the wafer and the probe tips is made, there is substantially no relative movement therebetween. This prevents scratching of the thin metallized device contacts.

As described, the wedges 65 and on of the contact balls 98 are electrically insulated from their respective mounting means. Thus, by use of known electrical circuit means connected between the wedges and insulated balls, the lifting of the wedges 65 from contact with the balls 98 provides an accurate and simple means for indicating positive engagement of each probe 17 with the wafer 6.

Further details of the tip ends 42 of the probes 17 are now given. With reference to FIG. 4, the tip end 42 of the probe tapers in width to substantially a point 120 having, for example, a radius of curvature in the order of ½ mil, and tapers to a small thickness in the order, for example, of 2 to 3 mils.

Two rods 121 are press fitted within bores in the probe members 40 and have outwardly extending cantilevered ends 123. A fine wire 126 of a hard material, such as tungsten, extends along the edges 128 and 130 of the probe and around the point 120 of the probe. The ends of the wire terminate in loops which are looped around the rod ends 123. The rods 121 serve as tensioned springs to maintain the wire 126 under tension. With a 1 mil diameter wire 126 sharply bent around the point 120 of the probe, a probe "tip" 21 having a radius of curvature of 1¼ mils with practically no tolerance is provided.

To facilitate threading of the wire 126 around the probe point 120, and for maintaining the wire in place, a fine tubing 132 is attached, as by solder, to the lower edge 130 of the probe. Also, although not illustrated, small grooves are preferably provided along the probe edges 128 and 130 to help retain the wire 126 in place.

In use of the probe 17, only the portion of the wire 126 curved around the probe point 120 engages the device contacts and only the wire is subject to wear. Since fine wires 126, such as, for example, the 1 mil diameter tungsten wire used in the present embodiment, can be drawn to a high degree of precision, and since the probe tip ends 42 can be machined to a high degree of accuracy, a high degree of accuracy and uniformity of sharpness of the probe tips 21 is obtainable. The tungsten wire is hard and wears well. When excessive wear of the wire does occur, the wire is readily replaced in a simple threading operation.

An advantage of the fact that the sharpness of the probe tips is readily controllable is that each device is tested under uniform test conditions of probe pressure and engagement area, whereby accurate and reproducible test results are obtained.

Preferably, for reasons of low and uniform electrical resistance, the tip end 42 of the probe, which can be made from hard machine steel, is plated with a thin plating of gold on top of a thin plating of copper. A connector wire 134 is secured to the probe 17 by means of a cap 135 press fitted onto the end of a rod 136 mounted on the probe member 40. The wire 134 is connected to the electrical testing means, not shown.

In another embodiment, illustrated in FIG. 5, the probe contacting "tip" 21′ comprises a small ball 139 of a hard and corrosion resistant material mounted, as by soldering, on the probe point 120′. In one embodiment, a 0.002 inch diameter iridium ball is used. Other metals, such as various hard alloys of the noble metals can be used. To facilitate the mounting of the ball 139 on the probe point 120′, the point is preferably provided with a small flat. The ball 139 provides a tip 21′ having an accurate radius of curvature, and the ball is readily replaceable upon wear.

*Wafer mounting*

In operation of the probing apparatus, a wafer 6 to be tested is mounted on the wafer platform 34 (FIG. 3) which is mounted, in turn, on a fixture 36 secured to the workpiece supporting column 28.

The wafer platform 34, shown in FIGS. 11, 12, and 13, comprises a circular member having a flat upper surface 142 (FIG. 12) for receipt of the wafer 6, and an undersurface 144 on which is mounted three steel bearing balls 146, 147, and 148. As described below, a high degree of accuracy of neither the dimension of the balls nor their positioning on the undersurface 144 is required, the balls nevertheless providing highly accurate lateral and angular orientation of the platform 34 on the fixture 36.

A convenient way of positioning the bearing balls 146, 147, and 148 on the surface 144 is to drill three bores 150 (one of which is shown in FIG. 13) in the undersurface 144, allow the balls to be gravity centered in the bores 150, and solder or braze the balls in place.

For accurately controlling the vertical positioning of the upper surface 142 of the platform 34 with respect to the fixture 36, a peripheral portion 152 of the undersurface 144 of the platform is ground flat, the portion 152 thus serving as a bearing ring.

To protect the bearing balls 146, 147, and 148 against damage during handling of the platform 34, steel inserts 154 are provided on the undersurface 144.

The fixture 36, shown in FIGS. 14, 15, and 16, comprises a cylindrical member 156 (see also FIG. 3) having a flat upper surface 157 surrounded by a ring bearing 158 having a flat upper surface. Accurately positioned on the fixture upper surface 157 is an L-shaped block 159 having legs 160 and 161. Each leg 160 and 161 has a flat side surface 162 and 163, respectively, which are perpendicular to the upper surface 157. The leg 160 is further provided with a semicircular groove 165 to provide clearance for receipt of the middle ball 147 (FIG. 16) of the platform 34. A latch arm 167 is provided on the upper surface 157, the arm 167 being pivotally mounted on a pin 168 and being biased by a spring, not shown, in a direction towards the leg 160. As shown in FIG. 15, the side 169 of the arm 167 is angled inwardly in a direction towards the surface 157.

In the mounting of the platform 34 on the fixture 36, the platform is roughly aligned by eye with the fixture and pressed thereon. The middle ball 147 on the platform enters the groove 165 (FIG. 16) in the leg 160 and forces the arm 167 outwardly against its spring bias. The arm 167 applies pressure against the middle ball 147 at an angle of about 45° to the leg 160, whereby the ball 146 is pressed against the side 162 of the leg 160, and the ball 148 is pressed into contact with the sides 162 and 163 of the two legs 160 and 161, respectively. The middle ball 147 does not engage the wall of the groove 165. The three point engagement of the balls 146 and 148 with the side surfaces of the legs 160 and 161 provides a particular and positive lateral and angular orientation of the platform relative to the fixture 36. The angled side surface 169 of the arm 167 additional provided a downward force against the middle ball 147, thereby firmly pressing the bearing surface 152 on the platform 34 downwardly against the bearing 158 on the fixture 36. This locks the platform 34 on the fixture 36 in parallel relation therewith.

In use of the platform 34 and fixture 36 combination, a first fixture 36 is disposed at an operating station removed from the probing apparatus in preselected lateral and angular orientation with respect to, for example, the cross hairs of a machinist's microscope. A second fixture 36 is disposed on the probing apparatus. The lateral and angular orientation of the second fixture with respect to the axes of index of the indexing mechanism 30 on the probing apparatus is identical to the lateral and angular orientation of the first fixture with respect to the microscope cross hairs. The fixtures are preferably made with a high degree of accuracy, whereby substantially identical orientation of the two fixtures is obtained.

A platform 34 is then snapped in place on the first fixture 36. As described above, the two balls 146 and 148, even in the absence of close dimensional control thereover, provide a particular and a definite lateral and angular orientation of the platform 34 with respect to the fixture 36. A wafer 6 is then placed on the platform 34 and a particular row and column of the wafer devices are aligned with the cross hairs of the microscope. This provides proper lateral and angular orientation of the wafer. The wafer is then secured, as with wax, to the platform. The platform is then transferred to the fixture 36 on the probing apparatus. When snapped in place, the two balls 146 and 148 of the platform are pressed firmly against the legs 160 and 161 of the fixture on the probing apparatus. The platform is thus oriented relative to the fixture on the probing apparatus in the identical lateral and angular orientation it had relative to the first fixture. The rows and columns of wafer patterns are thus automatically aligned with the axes of index of the indexing mechanism 30, and the contacts of a first wafer device are registered with the tips 21 of the various probes 17.

It will be appreciated that, generally, a far larger number of platforms 34 than fixtures 36 are used. The platforms, which are not fabricated with a high degree of accuracy, are relatively inexpensive. The highly accurate fixtures, although comparatively expensive, are few in number. The capital expense associated with the use of platform-fixture combination, therefore, is relatively small.

*Operation*

In use of the apparatus described, a platform 34, having a wafer 6 to be tested thereon, is snapped in place on the fixture 36 on the support column 28. This automatically laterally and angularly aligns the wafer with the probing assembly 12 and the axes of index of the indexing mechanism 30, as described. Although not described, mechanisms of known type are preferably incorporated in the probing apparatus to make its operation automatic. Thus, after the platform 34 is mounted in place, the apparatus is activated and the air cylinder 37 in the supporting column 28 is actuated to lift the wafer 6 into contact with the tips 21 of the probes 17 of the various probing mechanisms 15. If all the probes 17 are engaged and lifted by the wafer, the separation of all the support arm 18 wedges 65 from the contact balls 98 produces a signal which causes activation of the vibrating mechanism 31 in the support column 28 for a preselected period of time.

The vibration of the wafer 6 provides an important advantage over the prior art apparatus. In the prior art apparatus, positive electrical contact between the probe tips and the wafer contacts through an electrically insulating films on the contacts is obtained by providing relative lateral movement between the probe tips and the wafer contacts during the initial contacting therebetween. This causes the probe tips to tear or gouge through the films. This, it has been found, tends to cause damage of the thin metallic contacts and, further, produces non-uniform and non-reproducible test results.

In the present apparatus, vertical vibration of the wafers causes penetration of the probe tips through the contact coating films in a controlled, uniform fashion. The test data obtained is reproducible, and damage to the contacts is avoided. Additionally, because penetration of the contact coatings is achieved through a controlled vibration of the wafer rather than by means of a gouging action, the probe tips of the present apparatus need not be as sharp as the probes of the prior art. This, in turn, provides lower electrical resistance between the probes and the contacts, which is desirable for obtaining accurate and sensitive testing of the wafer devices.

After vibration of the wafer, the electrical characteristics of the wafer device are measured. If the device is defective, the device is marked, e.g. by a drop of ink.

After a device on the wafer is tested, the wafer 6 is lowered and the indexing mechanism 30 indexes the column along, e.g., an X axis, a distance equal to the distance between adjacent columns of devices on the wafer. The wafer is then raised to engage a second wafer device on the row being tested with the probe tips 21. This cycle is repeated until the last device on the row of devices has been tested. Upon a subsequent indexing of the wafer in the X direction, one or more probes will be disposed beyond the edge of the wafer, hence will not be engaged by and will not be raised by the wafer. The signal thus produced by the failure of all the support arm wedges 65 to break contact with the contact balls 98 on the support platform 20 causes the indexing mechanism 30 to index the support column 28 in the Y direction to start a new row of devices. The support column 28 is then successively indexed in the reverse direction until all the devices along the new row are tested. This sequence is repeated until the last device on the wafer has been tested.

After several further indices, e.g. four, during which one or more probes fails to be engaged by the wafer, a signal is produced indicating the completion of testing of all the devices on the wafer. The wafer carrying platform 34 is then replaced to start the cycle anew.

What is claimed is:

1. A probing apparatus for testing devices on a surface of a semiconductor wafer, comprising:
    a plurality of probing mechanisms each comprising an extending probe and a probe support, said probe being mounted on said probe support by means of a gimbal, means for accurately disposing said probe in a preselected position with respect to said probe support, and means associated with said probe disposing means for indicating movement of said probe away from said preselected position;
    means for supporting a wafer in preselected relation with respect to said probing mechanisms, means for indexing said wafer supporting means and said probing mechanisms relative to one another for successively engaging each of said devices on the surface of said wafer with said probing mechanisms, and means for causing vibration of said wafer in a direction perpendicular to said surface during engagement of said probing mechanisms with said devices for effecting good connections therebetween.

2. A probing apparatus as in claim 1 wherein said probes each comprises a curved pointed member having a decreasing width and thickness towards the point of said member, and the width of said probe being substantially greater than the thickness thereof along substantially the entire length of said probe.

3. A probing apparatus as in claim 2 including a wire extending along an edge of said member and around said point, the portion of said wire extending around said point comprising the device engaging probe tip.

4. A probing apparatus as in claim 2 including a metal ball mounted on the point of said member.

5. A probing apparatus as in claim 1 wherein said probe disposing means comprises a pair of oppositely disposed balls mounted on said probe support, and a wedge member mounted on said probe.

6. A probing apparatus as in claim 1 wherein said wafer supporting means comprises a platform having a first surface for receipt of a wafer, a second surface opposite said first surface, and a plurality of balls mounted on said second surface, and
    a fixture on which said platform is mounted, said fixture comprising a third surface, a pair of legs on said third surface, said legs being transverse to one another, and first means for urging said balls into three point engagement with the sides of said legs.

7. A probing apparatus as in claim 6 including a bearing having a flat surface mounted on said platform second surface, said fixture including a bearing having a flat surface mounted on said third surface, and second means for urging said bearing surfaces against one another for clamping said platform to said fixture.

8. A probing apparatus as in claim 7 wherein said first and second urging means comprise a further ball mounted on said platform second surface, and an arm pivotally mounted on said fixture third surface, said arm being pivotally biased in a direction towards both of said legs and having a side surface angled inwardly in a direction towards said third surface, said arm being forced in a direction against its bias by engagement of said side surface with said further ball, whereby said further ball is urged towards both of said legs and towards said fixture third surface.

9. A probing apparatus as in claim 1 wherein:
    said each probe comprises a curved pointed member having a decreasing width and thickness towards the point of said member, and the width of said probe being substantially greater than the thickness thereof along substantially the entire length of said probe;

said probe disposing means comprising a pair of oppositely disposed balls mounted on said probe support, and a wedge member mounted on said probe;

said wafer supporting means comprising a platform having a flat first surface for receipt of a wafer and a second surface opposite said first surface, three balls and a bearing mounted on said second surface, said bearing having a surface parallel to and at a preselected spacing from said platform first surface; and a fixture on which said platform is mounted, said fixture comprising a third surface having mounted thereon a pair of legs, a second bearing having a surface parallel to said platform first surface, and a pivotally mounted arm, said legs being transverse to one another, one of said balls on said platform being engaged with a side of one of said legs, and a second of said balls being engaged with the sides of both of said legs, the surfaces of said bearings being engaged with one another, said arm being pivotally biased in a direction towards both of said legs and having a side surface angled inwardly in a direction towards said third surface, said arm being forced in a direction against its bias by engagement of said side surface with the third of said balls, whereby said third ball is urged towards both of said legs and towards said fixture third surface for urging said first and second balls into engagement with said sides of said legs and for urging said bearing surfaces against one another.

References Cited

UNITED STATES PATENTS

| | | | |
|---|---|---|---|
| 3,185,927 | 5/1965 | Margulis | 324—158 |
| 3,264,556 | 8/1966 | Krantz | 324—62 |
| 3,345,567 | 10/1967 | Turner | 324—158 |

RUDOLPH V. ROLINEC, *Primary Examiner.*

E. L. STOLARUM, *Assistant Examiner.*

U.S. Cl. X.R.

269—309; 324—72.5